US012755095B2

(12) United States Patent
Zhang et al.

(10) Patent No.: US 12,755,095 B2
(45) Date of Patent: Oct. 6, 2026

(54) PERCEPTION CAPTURE SYSTEM

(71) Applicant: Airbnb, Inc., San Francisco, CA (US)

(72) Inventors: Tiantian Zhang, Mountain View, CA (US); Shuai Shao, San Jose, CA (US); Ying Zhang, Palo Alto, CA (US)

(73) Assignee: Airbnb, Inc., San Francisco, CA (US)

( * ) Notice: Subject to any disclaimer, the term of this patent is extended or adjusted under 35 U.S.C. 154(b) by 135 days.

(21) Appl. No.: 18/735,264

(22) Filed: Jun. 6, 2024

(65) Prior Publication Data

US 2024/0411990 A1 Dec. 12, 2024

Related U.S. Application Data

(60) Provisional application No. 63/471,597, filed on Jun. 7, 2023.

(51) Int. Cl.
*G06F 40/279* (2020.01)
*G06F 40/58* (2020.01)

(52) U.S. Cl.
CPC ............ *G06F 40/279* (2020.01); *G06F 40/58* (2020.01)

(58) Field of Classification Search
USPC .................................................. 704/2–7, 257
See application file for complete search history.

(56) References Cited

U.S. PATENT DOCUMENTS 10,496,752 B1 * 12/2019 Crossley ................ G06N 20/00
10,509,863 B1 * 12/2019 Arfa ...................... G06F 18/213
10,558,759 B1 * 2/2020 Arfa ...................... G06F 40/295
10,685,183 B1 * 6/2020 Arfa ...................... G06N 3/0499
10,685,184 B1 * 6/2020 Arfa ...................... G06F 16/34
10,803,248 B1 * 10/2020 Arfa ...................... G06N 20/00
11,004,096 B2 * 5/2021 Thomas ............. G06Q 30/0242
11,030,539 B1 * 6/2021 Arfa ...................... G06N 3/0499
11,182,806 B1 * 11/2021 Arfa ...................... G06N 3/0499
2013/0110605 A1 * 5/2013 Grossman .............. G06Q 30/02 705/14.54

(Continued)

OTHER PUBLICATIONS

Zhang, Tiantian, "Airbnb Brandometer: Powering Brand Perception Measurement on Social Media Data with AI", Medium, [Online]. Retrieved from the Internet: <URL: https://medium.com/airbnb-engineering/airbnb-brandometer-powering-brand-perception-measurement-on-social-media-data-with-ai-c83019408051>, (Apr. 26, 2024), 14 pgs.

*Primary Examiner* — Leonard Saint-Cyr
(74) *Attorney, Agent, or Firm* — Schwegman Lundberg & Woessner, P.A.

(57) ABSTRACT

Systems and methods are provided to generate a set of vector representations for each word of a plurality of words in a set of social media data by inputting each word into each of a predefined number of machine learning models to output each of the set of vector representations, the set of social media data comprising social media data from a plurality of social network platforms in a predefined window of time. The systems and methods further provide for generating a similarity score for each vector representation in the set of vector representations for each word output from the predefined number of machine learning models with respect to a given brand name, and generating a perception score for each word based on the generated similarity score for each vector representation in the set of vector representations for each word.

20 Claims, 10 Drawing Sheets

(56) References Cited

U.S. PATENT DOCUMENTS

| | | | | |
|---|---|---|---|---|
| 2016/0140588 | A1* | 5/2016 | Bracewell .......... | G06Q 30/0204 705/7.33 |
| 2021/0150541 | A1* | 5/2021 | Gurbuxani ......... | G06Q 30/0185 |
| 2021/0271864 | A1* | 9/2021 | Litvin .................. | G06V 10/764 |

* cited by examiner

502

| | 2020-01-01 | 2020-02-01 | ... | 2022-03-01 | Average |
|---|---|---|---|---|---|
| Host | XX | XX | | XX | XX |
| Rental | XX | XX | | XX | XX |
| ... | | | | XX | XX |
| Home | XX | XX | | XX | XX |

⇨ Variance

504

| | 2020-01-01 | 2020-02-01 | ... | 2022-03-01 |
|---|---|---|---|---|
| Host | XX | XX | | XX |
| Rental | XX | XX | | XX |
| ... | | | | XX |
| Home | XX | XX | | XX |
| Variance | XX | XX | | XX |

⇨ Average

FIG. 5

600

| | Model | Calibrated-Similarity -based Score | Calibrated-Rank -based Score (Winner) |
|---|---|---|---|
| VADP | Word2Vec | 0.0010 | 0.0050 |
| | Fast Test | 0.0090 | 0.0230 |
| | DeBERTa | 0.0030 | 0.0002 |
| AVADP | Word2Vec | 0.0200 | 0.0130 |
| | FastTest | 0.0014 | 0.0011 |
| | DeBERTa | 0.0040 | 0.0004 |

FIG. 6

PERCEPTION CAPTURE SYSTEM

PRIORITY

This application claims the benefit of priority to U.S. Provisional Patent Application Ser. No. 63/471,597 filed Jun. 7, 2023, which is incorporated by reference herein in its entirety.

BACKGROUND

Brand perception refers to the general feelings and experiences of a customer within a company. A good brand perception encourages positive associations in people's minds. A company's brand is one of its key assets and differentiators in the market. Measuring brand perception, however, is an extremely challenging task. Traditional systems rely on customer surveys to find out what customers think about a business. The downside in such systems is bias in sampling and limitation in data scale.

BRIEF DESCRIPTION OF THE DRAWINGS

Various ones of the appended drawings merely illustrate example embodiments of the present disclosure and should not be considered as limiting its scope.

FIG. 5 is a diagram illustrating metrics to measure score variance, according to some examples.

FIG. 6 illustrates example variances, according to some examples.

DETAILED DESCRIPTION

Figure 1:
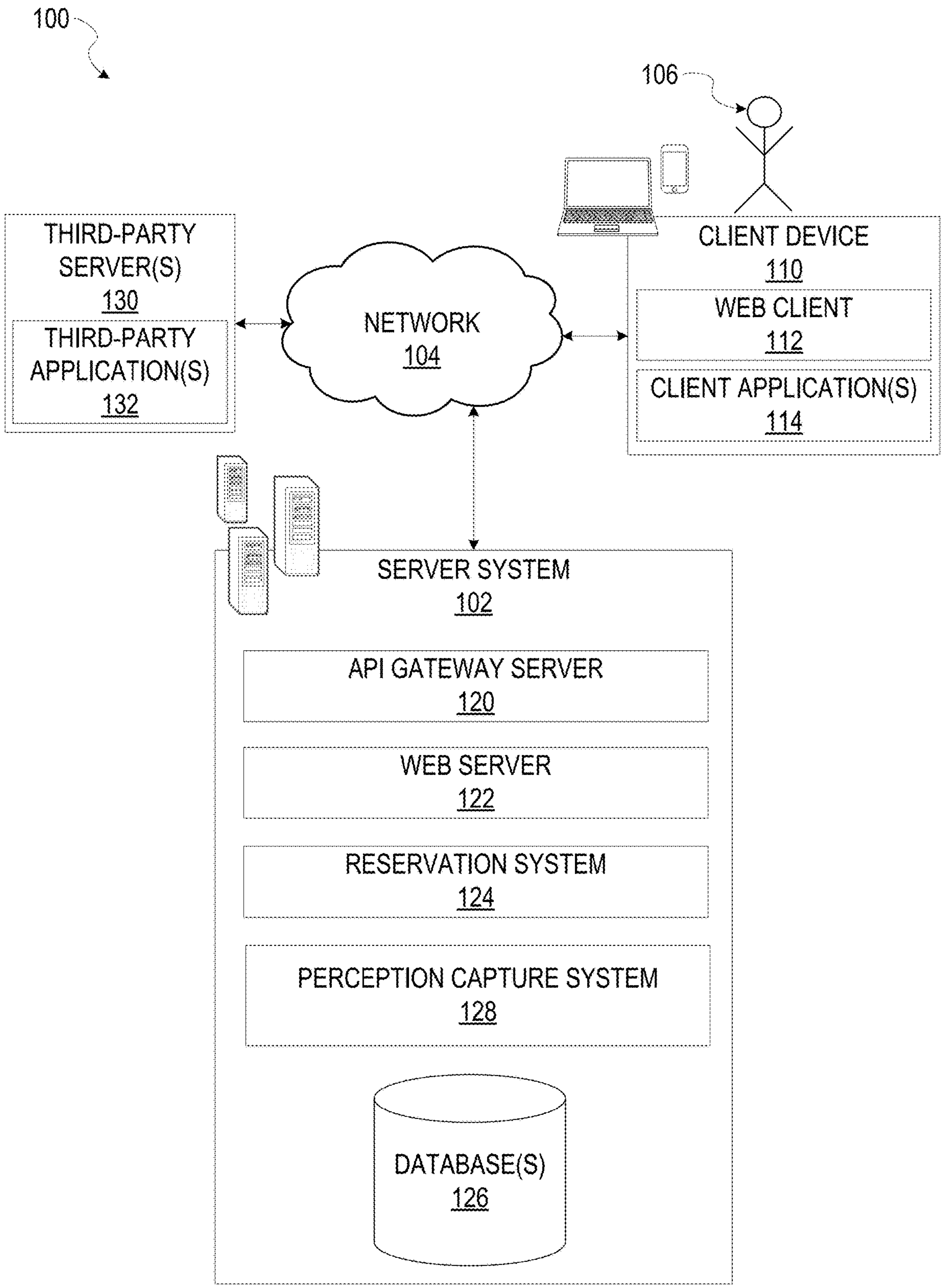
FIG. 1 is a block diagram illustrating a networked system, according to some examples.

Systems and methods described herein relate to a perception capture system using deep learning to understand brand perception on social media data. Social media data is a large consumer database where users share their experiences and is used as complementary consumer data to capture brand perceptions in some examples described herein. As explained in further detail herein, this social media data is analyzed to understand and capture brand perceptions via deep learning and to use deep learning on insights derived from metrics generated by the perception capture system.

Given such large columns of free text, in social media data, one aim is to capture concepts that are highly relevant to a given brand which reflect general brand perceptions. This is a technically challenging aim. For instance, traditional approaches to get top relevant topics are count-based, which extract the most frequent words and phrases. The obvious drawback of such an approach is that it may miss important concepts that are highly relevant to a given brand but are barely mentioned together in the same social media content. Examples described herein use approaches such as learning word embeddings, a dense vector representation of words, and utilizing embedding distances to measure similarity between words. The similarity between words discloses underlying relatedness between words. Word embeddings perform well in reserving semantic meanings and relatedness of words. For concepts represented as words (e.g., "guest," "host"), the perception capture system uses a similarity scoring methods, such as cosine similarity, between a word embedding and that of a given brand (e.g., "Airbnb") to measure how important the concept is with respect to the given brand. The measure of how important the concept is with respect to the given brand is referred to herein as a perception score.

Another technical problem is how to be sure that perception scores are comparable across different time periods. Examples described herein are able to compare perception scores because the perception scores are computed between word embeddings from the same embedding space. Therefore, there is no need for embedding space alignment in the perception capture system, which is a common practice in translation and temporal analysis of language changes. Further, to reduce the variability in embedding distances to generate stable time series tracking, the perception capture system employs technical strategies to mitigate instability. Stable embedding distances help preserve the inherent patterns and structures present in time series data and hence, contributes to better predictability of the tracking process. Additionally, it makes the tracking process more robust to noisy fluctuations.

In some examples, the perception capture system generates a set of vector representations for each word of a plurality of words in a set of social media data by inputting each word into each of a predefined number of machine learning models to output each of the set of vector representations. In some examples, the set of social media data comprises social media data from a plurality of social network platforms in a predefined window of time. In some examples, the predefined number of machine learning models each comprising a same type of machine learning model. The perception capture system further generates a similarity score for each vector representation in the set of vector representations for each word output from the predefined number of machine learning models with respect to a given brand name and generates a perception score for each word based on the generated similarity score for each vector representation in the set of vector representations for each word. These features are described in further detail below.

FIG. 1 is a block diagram illustrating a networked system 100, according to some example embodiments. The networked system 100 may include one or more computing devices such as a client device 110. The client device 110 may comprise, but is not limited to a mobile phone, desktop computer, laptop, portable digital assistant (PDA), smart phone, tablet, ultrabook, netbook, laptop, multiprocessor system, microprocessor-based or programmable consumer electronic system, game console, set-top box, computer in a vehicle, wearable device (e.g., smart watch, smart glasses), or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to perform a variety of function. In some examples, the client device 110 is used to post messages and media content to social media platforms and exchange messages with other client devices 110. In some examples, the client device 110 is used to request and receive reservation information, accommodation information, entry and access information for a reserved accommodation, set or update user preferences, and so forth, associated with travel. The client device 110 may also be a device of a user that is used to post and maintain a listing for a service, request and receive reservation information and guest information, generate entry and access information (e.g., access codes), set or update user preferences, and so forth.

One or more users 106 may be a person (e.g., guest, host, service personnel, customer support agent, social media user), a machine, or other means of interacting with the client device 110. In example embodiments, the user 106 may not be part of the networked system 100 but may interact with the networked system 100 via the client device 110 or other means. For instance, the user 106 may provide input (e.g., voice input, touch screen input, alphanumeric input) to the client device 110 and the input may be communicated to other entities in the networked system 100 (e.g., third-party servers 130, a server system 102) via a network 104. In this instance, the other entities in the networked system 100, in response to receiving the input from the user 106, may communicate information to the client device 110 via the network 104 to be presented to the user 106. In this way, the user 106 may interact with the various entities in the networked system 100 using the client device 110.

The networked system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the internet, a portion of the public switched telephone network (PSTN), a cellular telephone network, a wireless network, a Wi-Fi network, a WiMAX network, another type of network, or a combination of two or more such networks.

One or more portions of the network 104 may comprise short-range wireless communication, such as Bluetooth, WiFi, near field communication (NFC), ultraband, Zigbee, or other form of short-range wireless communication.

The client device 110 may access the various data and applications provided by other entities in the networked system 100 via a web client 112 (e.g., a browser, such as the Internet Explorer® browser developed by Microsoft® Corporation of Redmond, Washington) or one or more client applications 114. The client device 110 may include one or more client applications 114 (also referred to as “apps”) such as, but not limited to, a web browser, a messaging application, an electronic mail (email) application, an ecommerce site application, a mapping or location application, a reservation application, an entry or keypad access application, a customer support application, a social media application, and the like.

In some embodiments, one or more client applications 114 may be included in a given one of the client devices 110 and configured to locally provide the user interface and at least some of the functionalities, with the client application 114 configured to communicate with other entities in the networked system 100 (e.g., third-party servers 130, the server system 102), on an as-needed basis, for data and/or processing capabilities not locally available (e.g., to access reservation or listing information, request data, authenticate a user 106, verify a method of payment, receive an access code). Conversely, one or more client applications 114 may not be included in the client device 110, and then the client device 110 may use its web browser to access the one or more applications hosted on other entities in the networked system 100 (e.g., third-party servers 130, the server system 102).

The networked system 100 may further include one or more third-party servers 130. The one or more third-party servers 130 may include one or more third-party application (s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102, such as entry and access information for an accommodation. The third-party servers 130 may be a cloud computing environment, according to some example embodiments. The third-party servers 130, and any servers associated with the third-party servers 130, may be associated with a cloud-based application, in one example embodiment.

The server system 102 may provide server-side functionality via the network 104 (e.g., the internet or a WAN) to one or more third-party servers 130 and/or one or more client devices 110. The server system 102 is a cloud computing environment, according to some example embodiments. The server system 102, and any servers associated with the server system 102, are associated with a cloud-based application, in one example embodiment.

In one example, the server system 102 provides server-side functionality for an online marketplace. In some examples, the online marketplace may provide various listings for trip items, such as accommodations hosted by various managers (also referred to as “owners” or “hosts”) that can be reserved by clients (also referred to as “users” or “guests”), such as an apartment, a house, a cabin, one or more rooms in an apartment or house, and the like. In some examples, the online marketplace may further provide listings for other trip items, such as experiences (e.g., local tours), car rentals, flights, public transportation, and other transportation or activities related to travel. In some examples, the online marketplace may provide other services and products.

The server system 102 may include the API gateway server 120, a web server 122, a reservation system 124 and a perception capture system 128 that may be communicatively coupled with one or more databases 126 or other forms of data store.

The one or more databases 126 may be one or more storage devices that store data related to the reservation system 124, the perception capture system 128, and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 include cloud-based storage in some embodiments.

The reservation system 124 manages resources and provides back-end support for third-party servers 130, third-party applications 132, client applications 114, and so forth, which may include cloud-based applications. The reservation system 124 provides functionality for viewing listings related to trip items (e.g., accommodation listings, activity listings), generating and posting a new listing, analyzing and ranking images to be posted in a new listing, managing listings, booking listings and other reservation functionality, and so forth, for an online marketplace. Further details related to the reservation system 124 are shown in FIG. 2.

Figure 2:
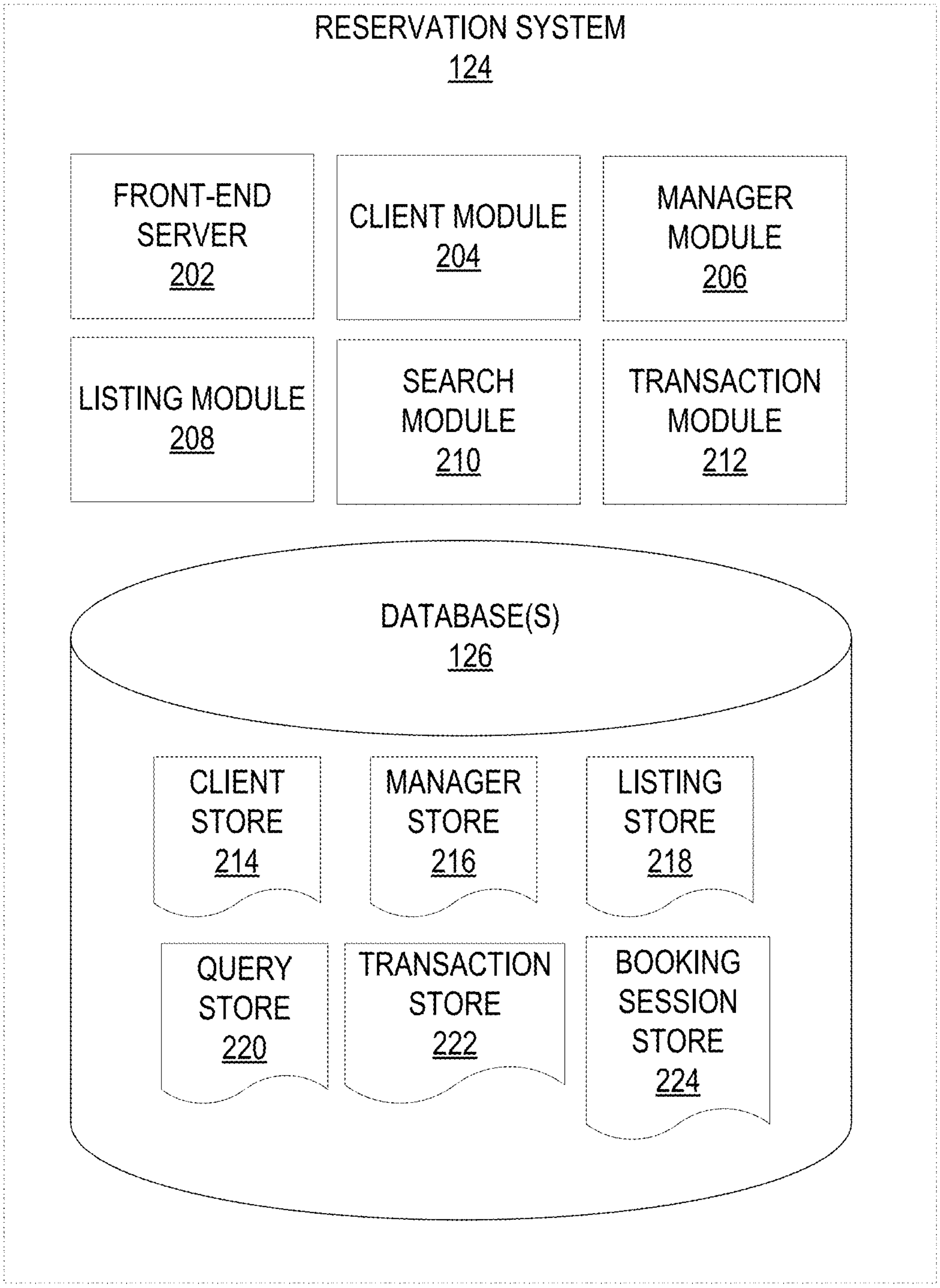
FIG. 2 is a block diagram illustrating a reservation system, according to some examples.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 can be implemented using a single computing device or a network of computing devices, including cloud-based computer implementations. The computing devices can be server-class computers including one or more high-performance computer processors and random access memory, which may run an operating system such as Linux or the like. The operations of the reservation system 124 can be controlled either through hardware or through computer programs installed in non-transitory computer-readable storage devices such as solid-state devices or magnetic storage devices and executed by the processors to perform the functions described herein.

The front-end server 202 includes program code that allows client devices 110 to communicate with the reservation system 124. The front-end server 202 can utilize the API gateway server 120 and/or the web server 122 shown in FIG. 1. The front-end server 202 can include a web server hosting one or more websites accessible via a hypertext transfer protocol (HTTP), such that user agents, such as a web browser software application, may be installed on the client devices 110 and can send commands to and receive data from the reservation system 124. The front-end server 202 can also utilize the API gateway server 120 that allows software applications installed on client devices 110 and third-party servers 130 and applications 132 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, an access code, smart device (e.g., accommodation device 140) preferences (e.g., user preferences), and so forth. The client's geographical location is either the client's current location (e.g., based on information provided by the client device 110) or the client's manually entered home address, neighborhood, city, state, or country of residence. The client location can be used to filter search criteria for time-expiring inventory relevant to a particular client or to assign default language preferences.

The client module 204 provides code for clients to set up and modify the client profile. The reservation system 124 allows each client to exchange communications, request transactions, and perform transactions with one or more managers.

The manager module 206 comprises program code that provides a user interface that allows managers (also referred to herein as "users," "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and descriptions that characterize the inventory; and any other relevant information. For example, for an accommodation reservation system, a listing may include a type of accommodation (e.g., house, apartment, room, sleeping space, or other), a representation of its size (e.g., square footage, number of rooms), the dates that the accommodation is available, and a price (e.g., per night, per week, per month). The listing module 208 allows a user 106 to include additional information about the inventory, such as videos, photographs, and other media, or such as accessibility and other information.

The geographical location associated with the listing identifies the complete address, neighborhood, city, and/or country of the offered listing. The listing module 208 is also capable of converting one type of location information (e.g., mailing address) into another type of location information (e.g., country, state, city, neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory). Information from each listing calendar is stored in the listing store 218.

The search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively changing which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and, in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Returning to FIG. 1, the server system 102 further includes a perception capture system 128. The perception capture system 128 manages resources and provides back-end support for third-party servers 130, third-party applications 132, client applications 114, and so forth, which can include cloud-based applications. The perception capture system 128 listens to mentions of topics related to a given brand from social network platforms such as Twitter, Facebook, Reddit, and the like. In some examples, the perception capture system 128 listens (e.g., monitors) such social platforms via an API or other means for monitoring social network platforms for topics related to the given brand.

The volume across all languages of social network data in social network platforms can be a million or more mentions a month, depending on the brand. For example, some testing was done using an accommodation platform brand and the volume was about a million mentions a month across about 19 social platforms. These mentions can include a status, a photo, news, a comment, a blog, a link, quoted status, a carousel, a story mention, a review, TV, video, attachment, or the like.

The perception capture system 128 captures brand perceptions on a regular basis and monitors one or more trends across time. In some examples, the perception capture system 128 captures brand perceptions at a regular predefined time period (e.g., monthly). Typically, some time is required for social media to respond to certain activities and events, and thus, a regular predefined time period, such as monthly, maintains a good balance of promptness and detectability. For instance, if a company launches an ad campaign related to a given brand, the perception capture system 128 can provide a timely analysis of the impact of the ad campaign on brand perception.

There are many technical issues in monitoring and using social media (also referred to as social platform) data. One technical issue is that social media posts are mostly user-generated and hence extraordinarily noisy. The content from social media posts can vary from status sharing to blog posts and reviews, among other means of sharing. To improve data quality, the perception capture system 128 performs iterations of data cleaning, such as, text filtering based on mentions, platforms, content, and emotions; removing hashtags, emoji/emoticons, hyperlinks and html escaping, slang lookup, spelling correction, and stemming; and the like.

Sparsity is another technical challenge for building high quality in-domain word embeddings. For instance, using a monthly dataset can result in an extremely small data set (e.g., ~20 million words) as compared to a typical dataset used to train good quality word embeddings. For example, the Google News Word2Vec model is trained on ~100 billion words. In some examples, warm-start from pre-trained Word2Vec models did not help with the issue since the in-domain data barely moved the learned embeddings. To compensate for data sparsity, perception capture system 128 performs the following:

- Translates all other languages into English. In some examples, only high quality translations are kept.
- Increases the negative sampling size to focus on high-quality word embeddings.
- Reduces the model size and embedding size to avoid overfitting and for better computational efficiency.
- Improves the modeling techniques to work better with a small dataset.

As mentioned above, given such large columns of free text, in social media data, one aim is to capture concepts that are highly relevant to a given brand which reflect general brand perceptions. This is a technically challenging aim. For instance, traditional approaches to get top relevant topics are count-based, which extract the most frequent words and phrases. The obvious drawback of such an approach is that it may miss important concepts that are highly relevant to a given brand but are barely mentioned together in the same social media content. Examples described herein use approaches such as learning word embeddings, a dense vector representation of words, and utilize embedding distances to measure similarity between words. The similarity between words discloses underlying relatedness between words. Word embeddings perform well in reserving semantic meanings and relatedness of words. For concepts represented as words (e.g., "guest," "host"), the perception capture system uses a similarity scoring methods, such as cosine similarity, between a word embedding and that of a given brand (e.g., "Airbnb") to measure how important the concept is with respect to the given brand. The measure of how important the concept is with respect to the given brand is referred to herein as a perception score.

The perception capture system 128 generates the perception score and then uses the perception score to identify top concepts representing brand perception and to monitor brand perception changes across time. In some examples, the perception score utilizes a cosine similarity between a given brand (e.g., "Airbnb") and the specific keyword (brand perception):

$$A(irbnb)\cdot K(eyword) = \|A\|\|K\|\cos\theta, \quad \text{(Eq. 1)}$$

$$\text{where } \cos(\theta) = \frac{A\cdot K}{\|A\|\|K\|} = \frac{\sum_{i=1}^{n} A_i K_i}{\sqrt{\sum_{i=1}^{n} A_i^2}\sqrt{\sum_{i=1}^{n} K_i^2}}$$

This is explained in further detail below.

The perception capture system 128 uses various modeling techniques. Word embeddings obtained from neural network models as approaches in natural language understanding can be used in examples described herein. A variety of word embedding models, from quintessential algorithms Word2Vec and FastText, to the latest language model DeBERTa are compared in terms of generating reliable perception scores. It is to be understood that these are example neural network models that can be used in examples described herein and that other neural network models can also be used.

One example word embedding model that can be used by the perception capture system 128 is Word2Vec. Word2Vec is the simplest and most widely used word embedding model since 2013. Given a sliding window of fixed length moving along a sentence, the model predicts the target word given the context word, also known as Continuous-Bag-of-Words (CBOW), or the other way around, the context word given the target word, otherwise known as Skip-gram. In some examples, monthly Word2Vec models were built using the Gensim library. As a result, the following practices can be used in some examples to generate good word embedding outcomes. First, CBOW may be used since it may work better than Skip-gram in terms of computation efficiency. Second, larger window size may help with capturing relatedness rather than synonyms, in some examples. In some examples, the perception capture system 128 uses a window size of 50. Third, in some examples, a larger number of negatives and smaller embedding dimensions are preferred due to small data volume. In some examples the perception capture system 128 uses a vector_size=64, and negative=500. Finally, fine-tuning on pre-trained Word2Vec models (e.g., Google News model) may not capture in-domain word relatedness at all, in some examples. Accordingly, these models are trained from scratch instead.

Word2Vec produced decent in-domain word embeddings. The classic examples showing the incredibility of embeddings are the concept of analogies. For example, "king"−"man"+"woman"~="queen." Using Airbnb as an example brand, domain-specific word embeddings, the perception capture system 128 can capture analogies in Airbnb domain, such as "host"−"provide"+"guest"~="need," "city"−"mall"+"nature"~="park."

Another word embedding model that can be used by the perception capture system 128 is FastText. The biggest difference between FastText and Word2Vec is that FastText treats each word as being composed of n-gram of characters. It takes into account the internal structure of words, and hence, it works better for morphologically rich languages and rare words. Moreover, it is more robust to out-of-vocabulary words and smaller datasets.

As inspired by Sense2Vec, which assigns "sense" to words and generates word embeddings for each sense of the word (e.g., NOUN, ADV, etc.), the perception capture system 128 associates words with sentiments. Each social media post has a sentiment indicator: positive, negative or neutral. For every word, the perception capture system 128 assigns its sentiment as the corresponding sentiment of the post, and each word to sentiment pair forms a brand perception concept on the sentiment level. For example, "airbnb" now becomes "airbnb|Positive," "airbnb|Negative" and "airbnb|Neutral." Then the perception capture system 128 trains FastText models to learn embeddings on such sentiment pairs. The benefit of doing so is that the perception capture system 128 is able to integrate sentiment signals and obtain brand perceptions on a more granular level. For example, if a high perception score is detected between "airbnb" and "booking," we can tell it is because users complimented or complained about their booking experiences.

In some examples, FastText embeddings are trained using Meta's open source library fastText. Since the default settings resulted in a good balance on quality and training speed, not much hyper-parameter tuning was conducted, in some examples. The resulting FastText embeddings for concepts with sentiments did provide interesting insights. For example, in the top 100 concepts for April 2020, "coronavirus" showed up in the negative sentimental concepts but not in the positive sentimental concepts, which is as expected since the coronavirus hit in March 2020. Moreover, in the top 100 concepts of March 2022, "ukraine" showed up in the positive sentimental concepts, which reflected all the support for Ukraine from a given brand and users since the war started.

Another word embedding model that can be used by the perception capture system 128 is DeBERTa. Recent progress in transformer-based pre-trained language models (e.g., BERT) has significantly improved the performance of many natural language processing tasks. One advantage of such models is that they are capable of generating contextualized word embeddings. The same word could have different meanings when surrounded by different contexts. Such context-agnostic embeddings can better handle negations (e.g., not, don't) and sentiment. For example, if the post is "Airbnb finds me a place to stay," the learned relatedness between "airbnb" and "stay" will increase. If the post is "Airbnb doesn't find me a place to stay," ideally, the learned relatedness between "airbnb" and "stay" should decrease. Additionally, the models can be used to encode out-of-vocabulary words and even phrases.

In example embodiments, a DeBERTa based word embeddings is developed, which is one of the latest and most successful descents of BERT. DeBERTa works better with smaller dataset and pays more attention to surrounding context via disentangled attention mechanisms. In some examples, everything was trained from scratch on in-domain data using the Hugging Face Transformers library: new tokenizer and new DeBERTa models.

The in-domain tokenizer learned frequent words and phrases through Airbnb related social media posts. For example, "airbnb" will be tokenized as "air" and "bnb" by the original DeBERTa tokenizer, but the perception capture system 128 in-domain tokenizer will make them as one token "airbnb."

Considering the dataset is much smaller as compared to the original DeBERTa pre-training dataset, the model size is shrunk significantly in examples described herein. More specifically, in some examples, the model has a hidden_size=192, intermediate_size=768, num_attention_heads=3, num_hidden_layers=6 and pooler_hidden_size=192.

There are multiple ways of extracting word embeddings from BERT-style models. Based on experiments, concatenating the last attention layer embeddings resulted in the best word embeddings, which reveals more relatedness between words in terms of brand perception concepts.

The perception capture system 128 further performs score calibration. As mentioned above, for monitoring purposes, the perception capture system 128 builds embedding models on a regular basis, such as a monthly basis as one example of a time period, and, in some examples, each model is trained from scratch without any warm start. One common concern is if the perception scores are comparable if the embedding spaces change every month. Examples described herein are able to compare perception scores because all the perception scores are computed between word embeddings from the same embedding space. In some examples, no cross-month embedding comparisons are conducted. Therefore, there is no need for embedding space alignment in this work, which is a common practice in translation and temporal analysis of language changes.

By monitoring the brand perception scores changes over time, the perception capture system 128 reveals how a given brand perception changes among global consumers. For example, if the Airbnb brand perception scores of "home" keep increasing every year, this would be a strong indicator that more and more hosts chose Airbnb as their home sharing platform and Airbnb successfully made more guests feel like home during their stays.

The perception capture system 128 accounts for the variability of word embeddings when making conclusions via perception scores. The stability of word embeddings has been studied a lot in the past. The causes of the variability of word embeddings ranges from the underlying stochastic nature of deep learning models to the quantity and quality changes of data corpus across time.

The perception capture system 128 utilizes the generated perception scores to capture monthly, or other time period, top perceptions and generate time series tracking on perceptions of interest. To improve the stability and reliability of the perception scores, in some examples, the perception capture system 128 takes at least one of the following strategies to mitigate instability and thus, to reduce the variability of perception scores to generate stable time series tracking. Stable perception scores help preserve the inherent patterns and structures present in time series data, and hence it contributes to better predictability of the tracking process. Additionally, it makes the tracking process more robust to noisy fluctuations. The first strategy to mitigate instability is score averaging over repetitive training with bootstrap sampling and the second strategy is a rank-based perception score.

In some examples, the perception capture system 128 performs score averaging over repetitive training with upsampling. For example, for each month (or other predefined time period), the perception capture system 128 trains N models with the same hyper-parameters, and takes the average of N perception scores as the final score for each concept (e.g., word). Meanwhile, to reduce the impact of data variability, the perception capture system 128 performs upsampling to make sure that each model iterates on an equal number of data points across months.

In some examples, the score variability is defined as:

$$\text{Variability}(A, M, V) = S(A, M, V \mid N) - S(A, M, V \mid N-1) \quad \text{(Eq. 2)}$$

where $$S(A, M, V \mid n) = \sum_{w \in V} \frac{\sum_{i=1}^{n} \text{Cos}Sim(w)}{n} / |V|,$$

CosSim(w) refers to the cosine similarity based perception score defined in Eq. 1, A refers to the algorithm, M refers to the time window (e.g., month), V refers to the vocabulary and |V| is the vocabulary size, and n refers to the number of repetitively trained models.

Figure 3:
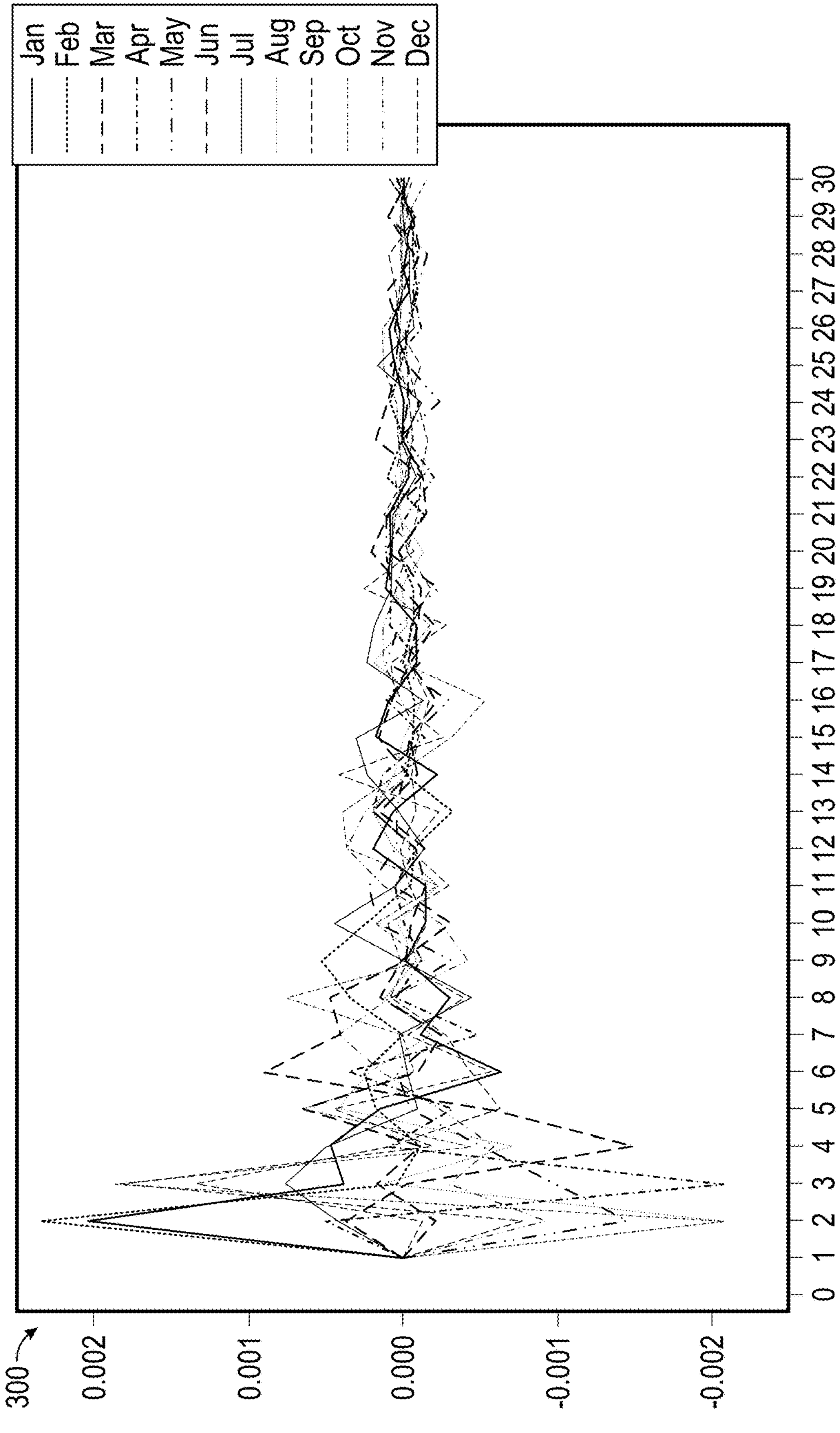
FIG. 3 is a diagram showing the score variability changes, according to some examples.

In some examples, as N approaches to 30, the score variability values converge and settle within a narrow interval, as shown in the below table and in FIG. 3.

| | Word2Vec | FastText | DeBERTa |
|---|---|---|---|
| Variability Interval at N = 30 | ±0.003 | ±0.001 | ±0.02 |

Hence, N=30 is used for the number of models to be used in some examples, as described in further detail below. It is to be understood that other numbers of models can be used in examples describe herein. FIG. 3 is a diagram 300 showing an example of score variability changes of the FastText models across months in 2020 with increasing N.

In some examples, the perception capture system 128 generates and utilizes a rank-based perception as a score strategy to mitigate instability. For example, an overlap between nearest neighbors can be used to measure the stability of word embeddings, since relative distances matter more than absolute distance values in downstream tasks. Therefore, in addition or in the alterative to the similarity-based perception scores as described above, rank-based perception scores are generated and used which solidly serves the purpose of capturing brand perceptions via monthly top perception and time series tracking, and in some examples, shows greater stability as compared to similarity-based perception scores.

For all the words in the vocabulary, the perception capture system 128 first ranks them in descending order of cosine similarity via Eq. 1. The rank-based similarity score is then computed as $$\frac{1}{\text{rank}(w)}$$

where w∈V. More relevant concepts will have higher rank-based perception scores.

Similarly, the perception capture system 128 uses score variability of rank-based scores. The score variability is defined the same as Variability (A, M, V) in Eq. 2 except that $$S(A, M, V \mid n) = \sum_{w \in V} \frac{\sum_{i=1}^{n} RankSim(w)}{n} / |V|$$

where RankSim(w) refers to the rank based perception score. With rank-based scores, when N approaches to 30, the score variability values converge to a much narrower interval as shown below.

| | Word2Vec | FastText | DeBERTa |
|---|---|---|---|
| Variability Interval at N = 30 | ±5.07e−06 | ±1.04e−06 | ±6.09e−06 |

Figure 4:
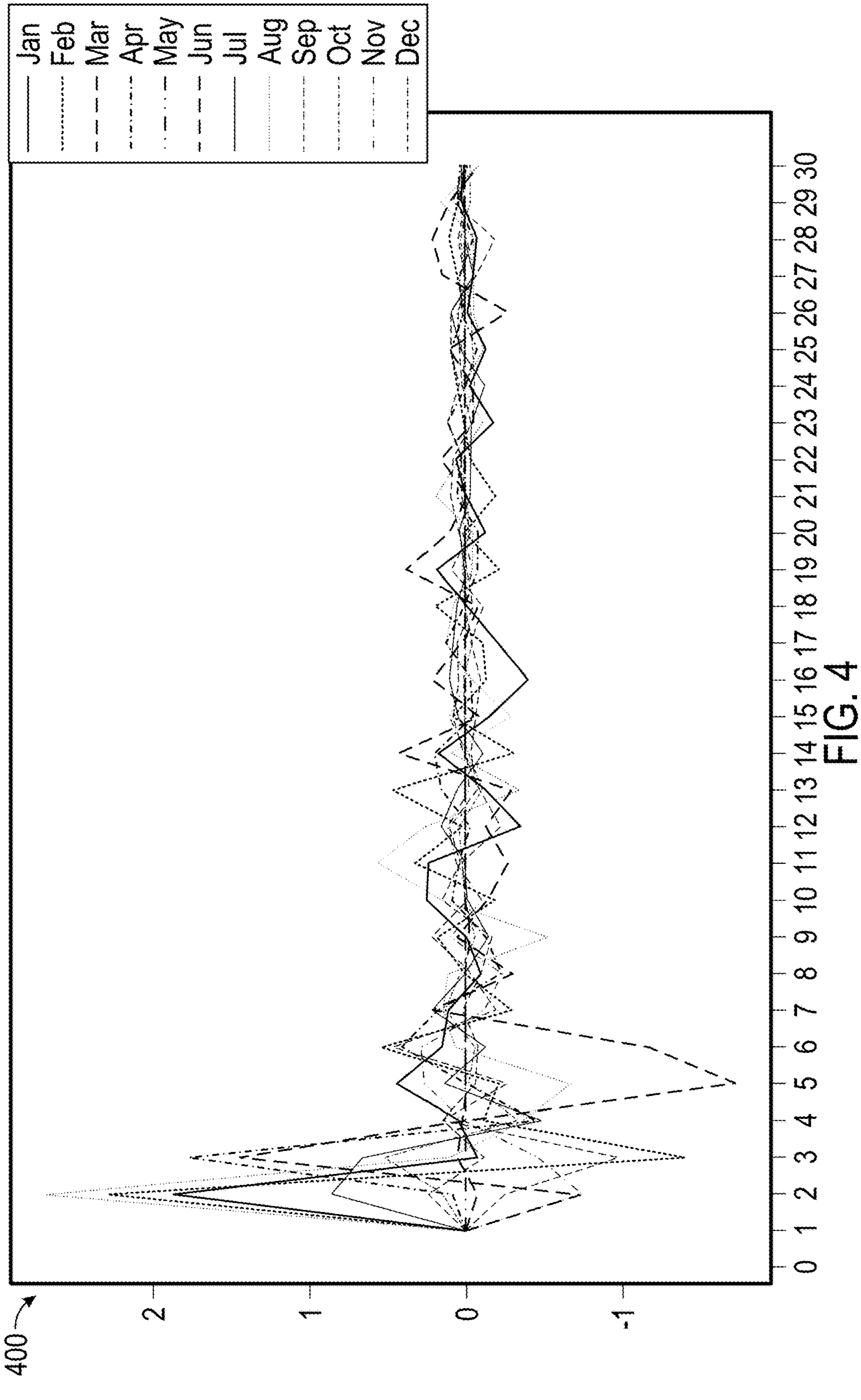
FIG. 4 is a diagram showing the rank-based score variability changes, according to some examples.

FIG. 4 shows a diagram 400 showing the rank-based score variability changes of the FastText models across months in 2020 with increasing N.

One technical challenge is that there is not a simple and ultimate way to conclude which score output is better since there is no objective 'truth' of brand perception. In some examples, by defining two variance metrics, we learned some characteristics of the score. Using the Airbnb brand again as an example, we first picked the group of top relevant brand perceptions of Airbnb: 'host', 'vacation', 'rental', 'love', 'stay', 'home', 'booking', 'travel', 'guest'. We defined two types of variances: (1) Variance Across Different Perceptions (VADP) and (2) Average Variance Across Different Period (AVADP).

For VADP, a higher value means that the score can better tell top perceptions apart. The example chart 502 in FIG. 5 illustrates this example.

For AVADP, the higher value means the more fluctuations across different period which is likely a bad thing because the selected brand perception are assumed to be relatively stable, and hence should not vary too much from month by month. The example chart 504 in FIG. 5 illustrates this example.

These statistics were checked on the calibrated results as shown in the example chart 600 in FIG. 6. We can see that the ranked-based score is the winner as compared to similarity-based scores:

Higher VADP: the score can better tell top perceptions apart (except DeBERTa)

Lower AVADP: more fluctuations than the Non-Ranked across different period which is likely a good thing, because the selected brand perception are assumed to be relatively stable, and hence should not vary too much from month by month These statistics were checked on the calibrated results in FIG. 6. We can see that the ranked-based score is the winner as compared to similarity-based scores.

Figure 7:
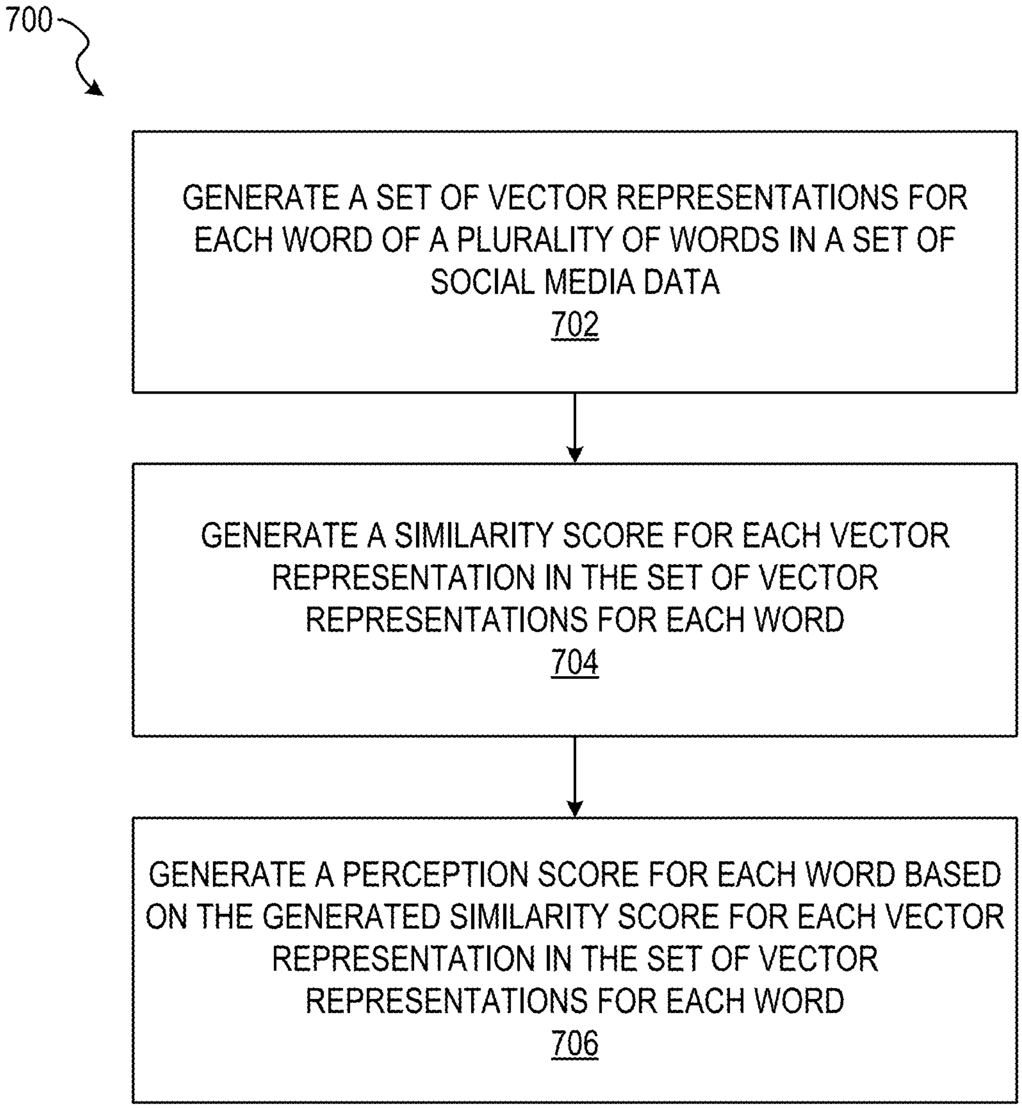
FIG. 7 is a flow chart illustrating aspects of a method, according to some examples.

FIG. 7 is a flow chart illustrating aspects of a method 700, according to some example embodiments. For illustrative purposes, the method 700 is described with respect to the networked system 100 of FIG. 1. It is to be understood that the method 700 may be practiced with other system configurations in other embodiments.

In operation 702, a computing system (e.g., server system 102, reservation system 124, or perception capture system 128) generates a set of vector representations for each word of a plurality of words in a set of social media data by inputting each word into each of a predefined number of machine learning models to analyze the input word to output each of the set of vector representations. In one example, the set of social media data comprising social media data from a plurality of social network platforms in a predefined window of time. For example, the set of social media data can be extracted or received from various social network platforms, such as Twitter, Facebook, Reddit, and the like, as explained above. In some examples, the social media data is data that is posted within the predefined window of time, such as in a given month.

Accordingly, the computing system extracts, from a plurality of social network platforms, social media data related to a given brand. For example, the computing system analyzes social media data and extract the social media data that mentions the given brand name. For example, the computing system extracts all posts on each of the plurality of social network platforms that contain at least one instance of the given brand name.

As mentioned above, one technical issue is that social media posts are mostly user-generated and hence extraordinarily noisy. The content from social media posts can vary from status sharing to blog posts and reviews, among other means of sharing. To improve data quality, the computing system performs iterations of data cleaning to generate the set of social media data. For example, the computing system cleans the data by text filtering based on mentions, platforms, content and emotions; removing hash tags, emoji/emoticons, hyperlinks and html escaping; slang lookup, spelling correction and stemming; or the like.

As also mentioned above, another technical problem is data sparsity.

Sparsity is another technical challenge for building high quality in-domain word embeddings. For instance, using a monthly dataset can result in an extremely small data set, such as about 21 million words, as compared to a typical dataset used to train good quality word embeddings. For example, the Google News Word2Vec model is trained on about 100 billion words. To compensate for data sparsity, perception capture system 128 enlarges an initial social media data set to generate the social media data by translating languages that are not English into English and discarding low quality translations, in some examples. For example, the perception capture system 128 translates all of the initial social media data set that is not in English to English and then can use a tool, such as ModernMT (MMT), CLD3, FastText, or the like, to determine a quality of the translations. Any translation that is below is certain quality threshold is discarded and thus, not included in the social media data to be analyzed by the predetermine number of machine learning models.

In another example, the computing system enlarges an initial social media data set to generate the social media data by randomly selecting and duplicating a subset of items in the initial set of social media data to include in the social media data to be analyzed by the predetermine number of machine learning models. One, both or other methods can be used to enlarge an initial social media data set to generate the social media data to be analyzed by the predetermine number of machine learning models.

The predefined number of machine learning models each comprise the same type of machine learning model. For example, all of the predefined number of machine learning models are Word2Vec, FastTest, DeBERTa, or other machine learning model. The predefined number is a number determined based on when a score variability converges and settles within a narrow interval, as explained above.

Before generating the set of vector representations for each word, the computing system trains each of the predefined number of machine learning models on the same training data to generate each of the predefined number of machine learning models configured to output a vector representation for a word. For example, the computing system trains each of the predefined number of machine learning models on the social media data comprising mentions (e.g., from within a specified time period, such as one month) of the given brand name. Each of the predefined number of machine learning models are trained given the training data and an objection function specific to the model.

The trained predefined number of machine learning models are then used to analyze the social media data. For examples, each word in the set of social media data is input into a first machine learning model of the predefined number (N) of machine learning models. In some examples, the set of social media data comprises a pre-defined vocabulary that consists of a high-quality subset of all the words in the social media data comprising meaningful words. For example, words such as the word "the" are ignored. Accordingly, each word of the subset of words of the social media data is input into the first machine learning model.

The first machine learning model analyzes each word and generates or outputs a vector representation, such as a word embedding, for each word, as explained above. This is done with each machine learning model of the predefined number of machine learning models. The result is a set of vector representations for each word comprising N vector representations for each word (e.g., one vector representation from each of the predefined number of machine learning models).

In operation 704, the computing system generates a similarity score for each vector representation in the set of vector representations for each word output from the predefined number of machine learning models with respect to a given brand name. In one example, the similarity score is generated using cosine similarity to measure how important the word is with respect to the given brand name, as explained above. It is to be understood that any method to generate a similarity score between a given vector representation and a given brand can be used by the perception capture system 128.

In operations 706, the computing system generates a perception score for each word based on the generated similarity score for each vector representation in the set of vector representations for each word. In one example, the computing system generates the perception score by calculating an average of the similarity scores for the vector representations in the set of vector representations for each word. For example, a given word will have N similarity scores (one for each vector representation in the set of vector representations for the given word). The computing system calculates an average similarity score for the N similarity score for the given word. The average similarity score for each word is the perception score, in this example. This is done for each word in the social media data.

In another example, the computing system generates the perception score for each word by, for all vector representations generated by each of a given machine learning model of the predefined number of predefined machine learning models, ranking the vector representations by similarity score and generating a ranked score for each vector representation based on the ranking. In some examples, the computing system generates the ranked score by calculating 1/rank, as explained above. The computing system generates the perceptions score for each word by calculating, for each word, an average of all ranked scores for the vector representations in the set of vector representations for each word.

In another example, the computing system generates the perception score for each word by adding the calculated average of the similarity scores for the vector representations in the set of vector representations for each word and the calculated average of all ranked scores for the vector representations in the set of vector representations for each word. The sum of these values for each word is the perception score for each word.

In the examples described above for FIG. 7, one type of machine learning model is used. In other examples, the process of FIG. 7 can be performed for each of a different type of machine learning model. For example, a first machine learning model, such as Word2Vec can be used in the process described with respect to FIG. 7. Then a second machine learning model, such as FastText, can be used in the process described with respect to FIG. 7. And in some examples, a third machine learning model, such as DeBERTa, can be used in the process described with respect to FIG. 7. In this way, one or more types of machine learning models can be used. Three types of machine learning models are described here as examples, it is to be understood that different, more, or less machine types of machine learning models can be used in examples described herein. As a result, each word for each model will have a perception score. For example, for each word, a first perception score is generated from using the first machine learning model (e.g., Word2Vec), a second perception score is generated from using the second machine learning model (e.g., FastText), and a third perception score is generated using the third machine learning model (e.g., DeBERTa). In this way, the perception scores generated from different models can be compared to get a good understanding of brand perceptions.

There are various uses cases that within which examples described herein can be used. For example, one type of insight output includes top perceptions, such as top 5, 10, 15 or other number of words with the highest perceptions scores, within a given time period, such as monthly, quarterly, annually, or other time period. For instance, the perception capture system 128 identifies top concepts based on the perceptions score for each word. The perceptions capture system 128 also compares the tops concepts to previously determined top concepts in previous time periods. Further, from top ranked perceptions, the perception capture system 128 can compare a given brand's results with other brands, such as comparing a given brand "Airbnb" with other travel companies. Moreover, the perception capture system can determine new emerging trends from the top ranked perceptions.

For example, one use case is to generate a monthly top perception in competitor analysis for top brand perception among key players in an online marketplace. For instance, there is a general perception that a travel company, such as Airbnb, has a unique brand image. But the technical challenge is how to determine what that brand image is or what are the brand images for other travel companies. The perception capture system 128 determines brand image by applying the above descried algorithms on social media content (e.g., text) mentioning other competitors. Using Airbnb as an example, with top perceptions such as "Stay" and "Home," Airbnb provides a brand image of "belonging," echoing its mission statement and unique supply inventory. While the other companies have "Rental," "Room," "Booking," a description of functionality not human sensation.

| | No. 1 Brand Perception | No. 2 Brand Perception |
|---|---|---|
| Airbnb | Stay | Home |
| Travel Company 1 | Rental | Vacation |
| Travel Company 2 | Rooms | Resort |
| Travel Company 3 | Booking | Tourism |

Further, top emerging perception reveals major events online. For instance, the top 10 (as an example) perceptions are generally stable month to month. For example, a few standing perceptions for Airbnb may be Home, Host, Stay, Travel, Guest and Rental. Emerging words that pop up in the top 10 list, may reflect major events associated with the brand. For example, in March 2020 and April 2020 the special perception captures (e.g., words that appeared in the top perceptions that are not standing perceptions) was "Coronavirus" which was the same time that a given brand was conducting special services to help ease the impact of the Coronavirus on its customers (e.g., hosts, users). As another example, a particular month may have a special perception captured of "IPO" when a company with a given brand successfully completes its IPO. As another example, a particular user's name or a product may come up as a special perception capture (e.g., John Smith or XYZ product) when a negative story is published about the user or product.

Figure 8:
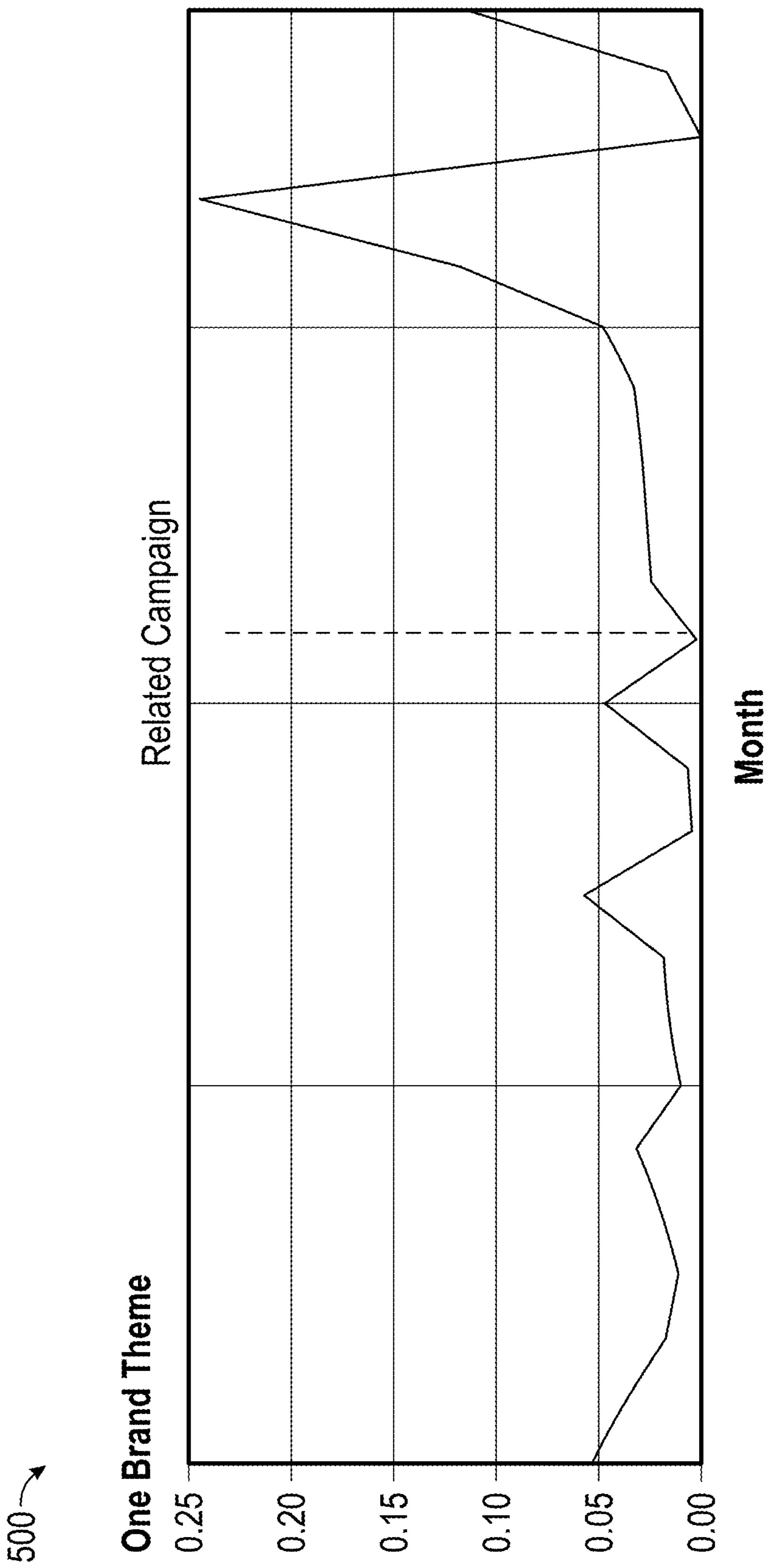
FIG. 8 shows an example diagram illustrating a calibrated rank-based score output, according to some examples.

As another example, another type of insight output includes a time series tracking on a certain perception. In this example, the perception capture system 128 selects certain perceptions, such as brand topics, and generates trends for the brand topics. A major campaign monitoring is one example of time series tracking. Businesses create campaigns to promote products/services and expand the brand image. The perception capture system 128 can capture a perception change on one specific brand theme after a related campaign. In some examples, the perception change is not sustainable after a period of time. FIG. 8 shows an example diagram 800 illustrating a calibrated rank-based score output showing how words associated with a related campaign appeared in social media posts, based on the perceptions scores for words related to the related campaign.

Another example, the perception capture system 128 uses machine learning models built on different segments, such as market, user group, sentiment, and so forth. By building and using models on different labels, the perception capture system can provide further insights based on segments.

The perception capture system 128 can further generate high quality word embeddings and more reliable similarity scores. For instance, more advance architectures can be used to create highly context-specific representations of words and handles better with sparse and noisy data. Since the perception capture system 128 tracks brand perception changes across periods of time (e.g., months), it is important to enhance interpretability of the score changes and make the similarity scores more robust for more reliable temporal analysis.

Further, the perception capture system 128 can perform better segmentation for clearer and more concise insights. For example, the perception capture system 128 can capture brand perceptions that are fully tailored to a given brand's target audience. Using the Airbnb brand as an example, the major user groups of the Airbnb brand in terms of roles are host and guest. The perception capture system 128 can provide unique aspects for each segment. Sentiment is another valuable signal of social media posts. The perception capture system 128 can generate and utilize word embeddings that are sentiment-agnostic to provide a more granular level of understanding.

The perception capture system 128 can establish benchmarking for faster validation and iterations. Word embedding evaluation is a challenging task, which is highly problem dependent. Generating a golden dataset for measuring the embedding quality offline can be created with the help from human labels on tasks that are similar to brand perception.

The perception capture system 128 can generate additional metrics reflecting social media brand perception. These can be a series of metrics based on different dimensions of brand attributes. The perception capture system 128 can also establish a monitoring routine of brand image.

In examples described herein the perception capture system 128 uses neural networks machine learning models. It is to be understood that other types of machine learning models can be used in examples described herein. For example, the perception capture system 128 can leverage large language models (LLMs) to enhance capabilities for brand perception understanding. For instance, the perception capture system 128 can utilize LLMs for enhanced topic detection and sentiment understanding since LLMs excel as identifying nuanced topics and understanding sentiment withing text data. This can help capture a true essence of online conversations about a given brand.

Further, in-context learning with zero-shot or few-show approaches can be utilized by the perception capture system 128. By employing zero-shot or few-shot learning techniques, LLMs can learn and adapt to specific contexts like a given brand name mentions without requiring massive amounts of labeled data. This enables the perception capture system 128 to extract relevant topics and sentiment associated with each reference to a given brand within online conversations.

Moreover, the perception capture system 128 can cluster topics and sentiment analysis using LLMs. LLMs can identify clusters of related topics within the extracted data. This allows the perception capture system 128 to categorize brand perceptions associated with a given brand, including positive, negative and neutral sentiment.

In addition, perception capture system 128 can leverage LLMs to achieve a more granular understanding of brand perception. This can include user role segmentation. For example, LLMs can analyze text to distinguish between guest an host perspective within mentions for a given brand (e.g., Airbnb). This allows the perception capture system 128 to provide insights into how different user groups perceive a given brand. This can further include product segmentation for a given brand. For instance, LLMs can analyze text content and differentiate between discussion about different products of a given brand, such as home reservations, experience reservation, and the like. This allows perception capture system 128 to generate deeper insights into specific aspects of brand perception.

Brand perception can also be gleaned from sources other than text analysis. LLMs that incorporate multi-modality can be used by perception capture system 128 to further enhance brand perception capabilities. For example, advanced LLMs can analyze not only textual content but also visual data like images and videos associated with mentions for a given brand. This allowed the perception capture system 128 to capture brand perception beyond traditional text-based sources to provide a more holistic understanding.

Figure 9:
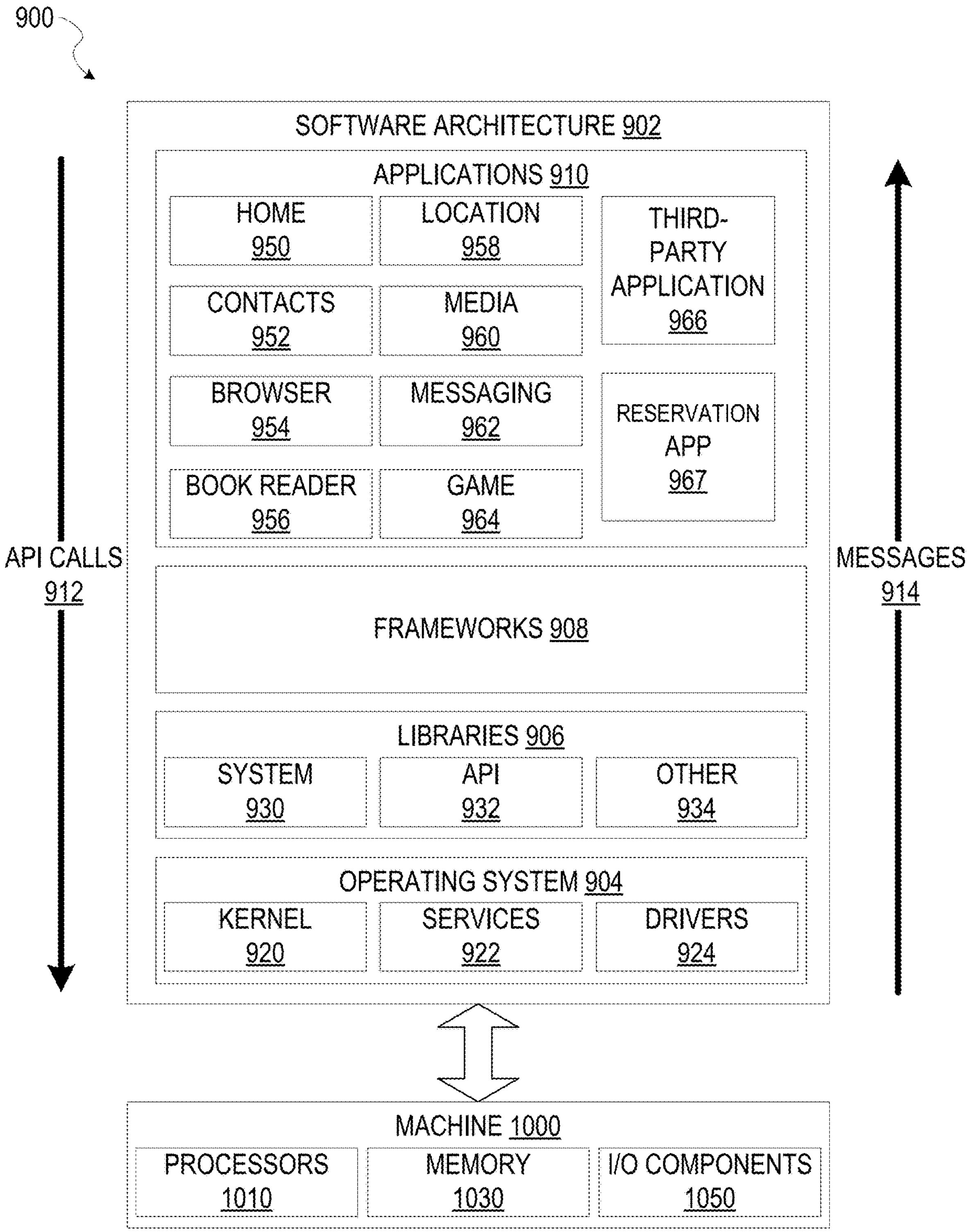
FIG. 9 is a block diagram illustrating an example of a software architecture that may be installed on a machine, according to some examples.

FIG. 9 is a block diagram 900 illustrating a software architecture 902, which can be installed on any one or more of the devices described above. For example, in various embodiments, the client device 110 and server systems 130, 102, 120, 122, and 124 may be implemented using some or all of the elements of the software architecture 902. FIG. 9 is merely a nonlimiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionalities. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Some embodiments may particularly include a reservation application 967, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The reservation application 967 may request and display various data related to an online marketplace and may provide the capability for a user 106 to input data related to the system via voice, a touch interface, or a keyboard, or using a camera device of the machine 1000, communication with a server system via the I/O components 1050, and receipt and storage of object data in the memory 1030. Presentation of information and user inputs associated with the information may be managed by the trip reservation application 967 using different frameworks 908, library 906 elements, or operating system 904 elements operating on a machine 1000.

Figure 10:
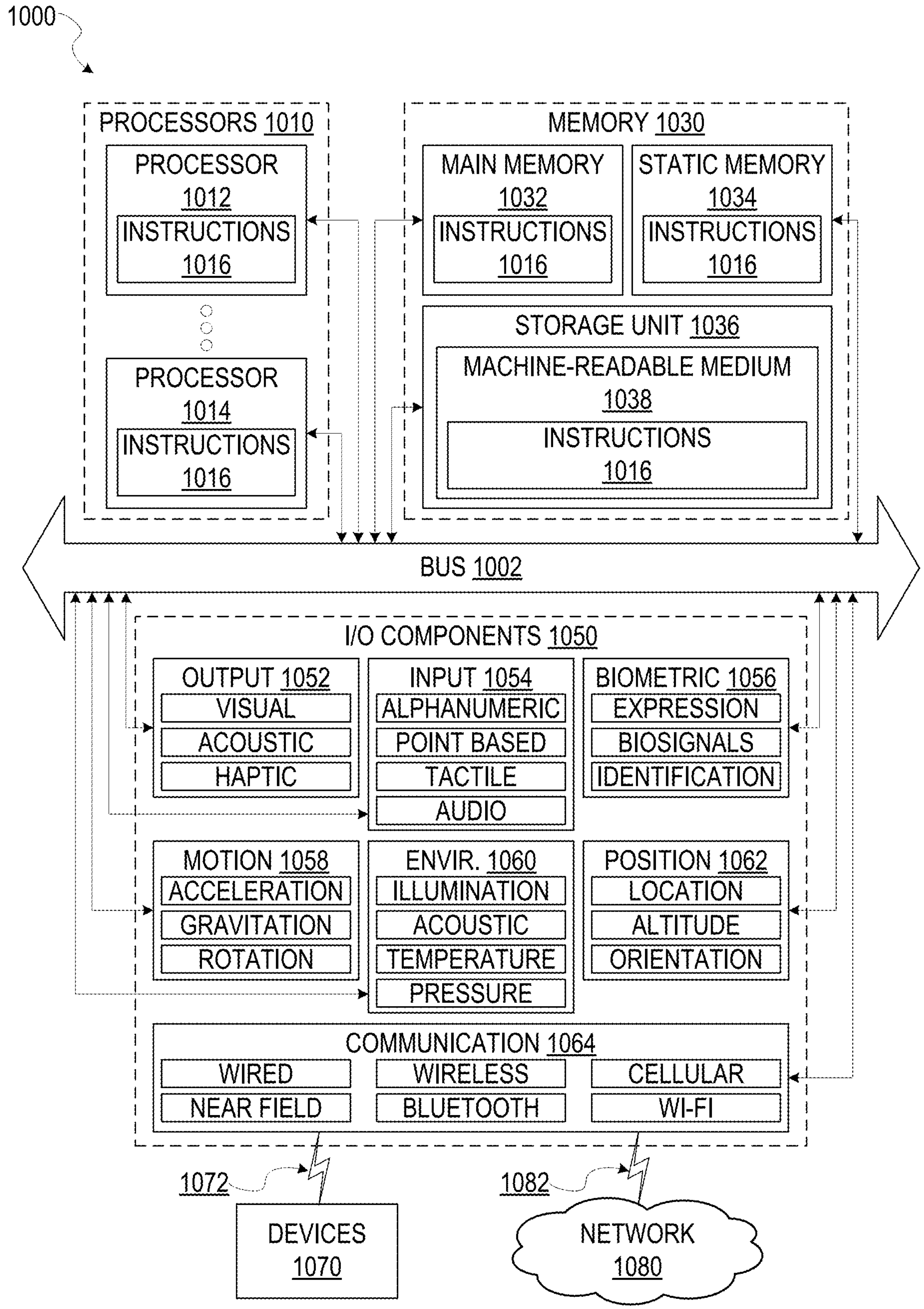
FIG. 10 illustrates a diagrammatic representation of a machine, in the form of a computer system, within which a set of instructions may be executed for causing the machine to perform any one or more of the methodologies discussed herein, according to some examples.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server system 130, 102, 120, 122, 124, and the like, or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other nonvolatile memory (e.g., erasable programmable read-only memory (EPROM)), or any suitable combination thereof. The term "machine-readable medium" specifically excludes nonstatutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, eye tracking), measure biosignals (e.g., blood pressure, heart rate, body temperature, perspiration, brain waves), identify a person (e.g., voice identification, retinal identification, facial identification, fingerprint identification, electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a USB).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect one-dimensional bar codes such as a Universal Product Code (UPC) bar code, multidimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a VPN, a LAN, a WLAN, a WAN, a WWAN, a MAN, the internet, a portion of the internet, a portion of the PSTN, a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile (GSM) communications connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., HTTP). Similarly, in other example embodiments, the instructions 1016 are transmitted or received using a transmission medium via the coupling 1072 (e.g., peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "nontransitory" should not be construed to mean that the medium is incapable of movement; the machine-readable medium 1038 should be considered as being transportable from one physical location to another. Additionally, since the machine-readable medium 1038 is tangible, the machine-readable medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:

training a predefined number of machine learning models using the same hyper-parameters to configure each of the predefined number of machine learning models to generate a vector representation for a given word;

inputting a first word of a plurality of words in social media data from a plurality of social network platforms in a predefined window of timeinto each machine learning model of the predefined number of machine learning models to generate a vector representation for the first word from each machine learning model;

generating a set of vector representations for the first word comprising all vector representations for the first word output from the predefined number of machine learning models;

performing operations, until there are no more words of the plurality of words left to input, comprising:

inputting a next word of the plurality of words into each machine learning model of the predefined number of machine learning models to generate a vector representation for the next word from each machine learning model; and generating a set of vector representations for the next word comprising all vector representations for the next word output from the predefined number of machine learning models;

generating a set of similarity scores for each set of vector representations for each word compared to a given name;

generating a perception score for each word based on the set of similarity scores for the set of vector representations for each word;

identifying top concepts based on the perception score for each word; and comparing the top concepts to previously determined concepts in previous time periods.

2. The computer-implemented method of claim 1, wherein each of the predefined number of machine learning models are trained on the same training data to generate each of the predefined number of machine learning models configured to output a vector representation for a word.

3. The computer-implemented method of claim 1, wherein each machine learning model of the predefined number of machine learning models comprises a same type of machine learning model, and the same type of machine learning model is a Word2Vec, FastText or DeBERTs machine learning model.

4. The computer-implemented method of claim 1, wherein each similarity score of the set of similarity scores is generated using cosine similarity to measure how important a word is with respect to the given name.

5. The computer-implemented method of claim 1, wherein generating a perception score for each word comprises calculating an average of the set of similarity scores for the set of vector representations for each word.

6. The computer-implemented method of claim 1, wherein generating a perception score for each word comprises:

for all vector representations generated by each of a given machine learning model of the predefined number of machine learning models, ranking the vector representations by similarity score and generating a ranked score for each vector representation based on the ranking; and generating the perception score for each word by calculating, for each word, an average of all ranked scores for the vector representations in the set of vector representations for each word.

7. The computer-implemented method of claim 1, wherein generating a perception score for each word comprises:

calculating an average of the set of similarity scores in the set of vector representations for each word;

for all vector representations generated by each of a given machine learning model of the predefined number of machine learning models, ranking the vector representations by similarity score and generating a ranked score for each vector representation based on the ranking;

calculating, for each word, an average of all ranked scores for the vector representations in the set of vector representations for each word; and generating the perception score for each word by adding the calculated average of the set of similarity scores in the set of vector representations for each word and the calculated average of all ranked scores in the set of vector representations for each word.

8. The computer-implemented method of claim 1, wherein before generating a set of vector representations for each word of a plurality of words in a set of social media data, the method comprises:

extracting, from a plurality of social network platforms, social media data related to a given brand; and performing data cleaning to generate the set of social media data.

9. The computer-implemented method of claim 7, wherein data cleaning comprises at least one of text filtering based on mentions, platforms, content and emotions; removing hash tags, emoji/emoticons, hyperlinks and html escaping; and slang lookup, spelling correction and stemming.

10. The computer-implemented method of claim 7, further comprising:

enlarging an initial social media data set to generate the social media data by performing at least one of the following operations:

translating languages that are not English into English and discarding low quality translations; and randomly selecting and duplicating a subset of items in an initial set of social media data to add to the initial set of social media data to generate the set of social media data.

11. The computer-implemented method of claim 1, wherein the predefined number of machine learning models is based on when a score variability converges and settles within a narrow interval.

12. The computer-implemented method of claim 1, further comprising:

identifying top perceptions based on a predefined number of words with the highest perception scores.

13. A computing system comprising:

a memory that stores instructions; and one or more processors configured by the instructions to perform operations comprising:

training a predefined number of machine learning models using the same hyper-parameters to configure each of the predefined number of machine learning models to generate a vector representation for a given word;

inputting a first word of a plurality of words in social media data from a plurality of social network platforms in a predefined window of time into each machine learning model of the predefined number of machine learning models to generate a vector representation for the first word from each machine learning model;

generating a set of vector representations for the first word comprising all vector representations for the first word output from the predefined number of machine learning models;

performing operations, until there are no more words of the plurality of words left to input, comprising:

inputting a next word of the plurality of words into each machine learning model of the predefined number of machine learning models to generate a vector representation for the next word from each machine learning model; and generating a set of vector representations for the next word comprising all vector representations for the next word output from the predefined number of machine learning models;

generating a set of similarity scores for each set of vector representations for each word compared to a given name;

generating a perception score for each word based on the set of similarity scores for the set of vector representations for each word;

identifying top concepts based on the perception score for each word; and comparing the top concepts to previously determined concepts in previous time periods.

14. The computing system of claim 13, each of the predefined number of machine learning models are trained on the same training data to generate each of the predefined number of machine learning models configured to output a vector representation for a word.

15. The computing system of claim 13, wherein each machine learning model of the predefined number of machine learning models comprises a same type of machine learning model, and the same type of machine learning model is a Word2Vec, FastText or DeBERTs machine learning model.

16. The computing system of claim 13, wherein each similarity score of the set of similarity scores is generated using cosine similarity to measure how important a word is with respect to the given name.

17. The computing system of claim 13, wherein generating a perception score for each word comprises calculating an average of the set of similarity scores for the set of vector representations for each word.

18. The computing system of claim 13, wherein generating a perception score for each word comprises:

for all vector representations generated by each of a given machine learning model of the predefined number of machine learning models, ranking the vector representations by similarity score and generating a ranked score for each vector representation based on the ranking; and generating the perception score for each word by calculating, for each word, an average of all ranked scores for the vector representations in the set of vector representations for each word.

19. The computing system of claim 13, wherein generating a perception score for each word comprises:

wherein generating a perception score for each word comprises:

calculating an average of the set of similarity scores in the set of vector representations for each word;

for all vector representations generated by each of a given machine learning model of the predefined number of machine learning models, ranking the vector representations by similarity score and generating a ranked score for each vector representation based on the ranking;

calculating, for each word, an average of all ranked scores for the vector representations in the set of vector representations for each word; and generating the perception score for each word by adding the calculated average of the set of similarity scores in the set of vector representations for each word and the calculated average of all ranked scores in the set of vector representations for each word.

20. A nontransitory computer-readable medium comprising instructions stored thereon that are executable by at least one processor to cause a computing system to perform operations comprising:

training a predefined number of machine learning models using the same hyper-parameters to configure each of the predefined number of machine learning models to generate a vector representation for a given word;

inputting a first word of a plurality of words in social media data from a plurality of social network platforms in a predefined window of time into each machine learning model of the predefined number of machine learning models to generate a vector representation for the first word from each machine learning model;

generating a set of vector representations for the first word comprising all vector representations for the first word output from the predefined number of machine learning models;

performing operations, until there are no more words of the plurality of words left to input, comprising:

inputting a next word of the plurality of words into each machine learning model of the predefined number of machine learning models to generate a vector representation for the next word from each machine learning model; and generating a set of vector representations for the next word comprising all vector representations for the next word output from the predefined number of machine learning models;

generating a set of similarity scores for each set of vector representations for each word compared to a given name; generating a perception score for each word based on the set of similarity scores for the set of vector representations for each word;

identifying top concepts based on the perception score for each word; and comparing the top concepts to previously determined concepts in previous time periods.

* * * * *